(12) United States Patent
Behrooz et al.

(10) Patent No.: US 12,461,135 B2
(45) Date of Patent: Nov. 4, 2025

(54) TRANSIENT DETECTION IN A HIGH-VOLTAGE NETWORK OF AN ELECTRIC VEHICLE

(71) Applicant: AUDI AG, Ingolstadt (DE)

(72) Inventors: Samy Behrooz, Manching (DE); Michael Bruckhuber, Munich (DE)

(73) Assignee: AUDI AG, Ingolstadt (DE)

( * ) Notice: Subject to any disclaimer, the term of this patent is extended or adjusted under 35 U.S.C. 154(b) by 167 days.

(21) Appl. No.: 18/447,245

(22) Filed: Aug. 9, 2023

(65) Prior Publication Data

US 2024/0051366 A1 Feb. 15, 2024

(30) Foreign Application Priority Data

Aug. 10, 2022 (DE) .......................... 102022120172.4

(51) Int. Cl.
| | |
|---|---|
| *G01R 31/00* | (2006.01) |
| *B60G 17/015* | (2006.01) |
| *B60G 17/08* | (2006.01) |
| *B60L 3/12* | (2006.01) |
| *G01M 17/04* | (2006.01) |
| *G01R 19/00* | (2006.01) |

(52) U.S. Cl.
CPC ......... *G01R 31/006* (2013.01); *B60G 17/015* (2013.01); *B60G 17/08* (2013.01); *B60L 3/12* (2013.01); *G01M 17/04* (2013.01); *G01R 19/0053* (2013.01); *B60G 2300/50* (2013.01); *B60G 2500/10* (2013.01)

(58) Field of Classification Search
CPC .. B60G 17/015; B60G 17/08; B60G 2300/50; B60G 2500/10–106; B60L 3/12; G01M 17/04; G01R 19/0053; G01R 31/006
See application file for complete search history.

(56) References Cited

U.S. PATENT DOCUMENTS

| | | | |
|---|---|---|---|
| 5,013,955 A | 5/1991 | Hara et al. | |
| 2007/0260372 A1 | 11/2007 | Langer | |
| 2016/0363508 A1 | 12/2016 | Osterhage | |
| 2018/0250999 A1* | 9/2018 | Golin | ..................... B60L 53/32 |

FOREIGN PATENT DOCUMENTS

| | | |
|---|---|---|
| DE | 69016702 T2 | 10/1995 |
| DE | 102015007632 A1 | 12/2016 |
| DE | 102020118852 A1 | 1/2022 |
| EP | 3193152 A1 | 7/2017 |
| JP | 2020147254 A | 9/2020 |

* cited by examiner

*Primary Examiner* — Mark L. Greene
(74) *Attorney, Agent, or Firm* — Seed Intellectual Property Law Group LLP

(57) ABSTRACT

A method for detecting a transient of a voltage damper of an electric vehicle, wherein an electric vehicle is provided, having a voltage network and a voltage damper connected to the voltage network, and a measurement device connected to the voltage network detects a transient produced by the voltage damper as a result of a loading, a method for designing a voltage component of a voltage network of an electric vehicle, and a device for loading a voltage damper of an electric vehicle.

10 Claims, 1 Drawing Sheet

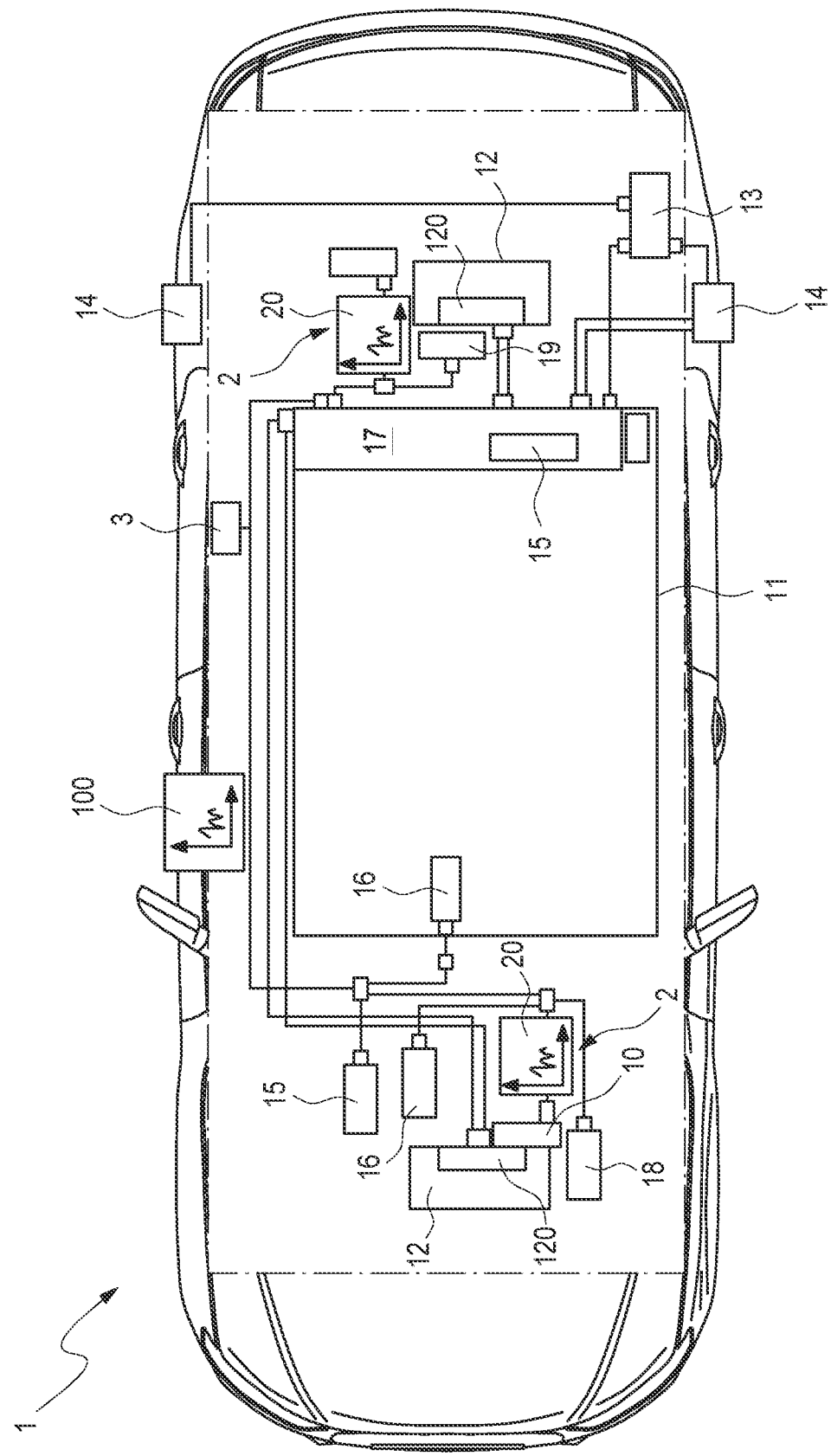

TRANSIENT DETECTION IN A HIGH-VOLTAGE NETWORK OF AN ELECTRIC VEHICLE

BACKGROUND

Technical Field

The disclosure relates to a method for detection of a transient of a high-voltage damper of an electric vehicle, wherein an electric vehicle is provided, having a high-voltage network and a high-voltage damper connected to the high-voltage network, and a measurement device connected to the high-voltage network detects a transient produced by the high-voltage damper as a result of a loading. Moreover, the disclosure relates to a method for designing a high-voltage component of a high-voltage network of an electric vehicle and a device for loading a high-voltage damper of an electric vehicle.

Description of the Related Art

Methods for detecting a transient produced by a high-voltage component (HV-component) of an electric vehicle which is connected to a high-voltage network of the electric vehicle are known in the prior art and serve for measuring an unwanted, yet unavoidable operation-related influence of the high-voltage component on the high-voltage network.

The electric vehicle can be designed as a passenger car (Pkw). Electric vehicles include pure battery-powered vehicles (battery electric vehicle, BEV) and hybrid vehicles (plugin hybrid electric vehicle, PHEV). For the high-voltage network, the synonymous terms high-voltage onboard network or high-voltage system are customarily used.

By a transient is meant an unpredictable/nonperiodic voltage and/or an unpredictable/nonperiodic current which is produced during a normal operation of the electric vehicle by the high-voltage component, especially upon change in the state of the high-voltage component. The high-voltage component applies the transient to the high-voltage network during the operation, so that other high-voltage components connected to the high-voltage network may become damaged.

The high-voltage components of an electric vehicle include, for example, a high-voltage damper (active damping ratio, ADR), a high-voltage battery, an electric motor, i.e., an electrical traction motor, power electronics (pulse inverter, PWR), a charger having a charging socket, a DC voltage converter (DC/DC), a heater (positive temperature coefficient, PTC), an intelligent emergency brake system (intelligent emergency brake, IEB), an electrical coolant compressor (eKK) and an electronic torque distributor (electronic torque vectoring, eTV).

In order to avoid damage, high-voltage components are protected as a precaution with capacitors or electronic filters against transients, which increases the costs and complexity of the high-voltage components. In many cases, however, it is difficult to determine whether the capacitors or filters provided for the protection are necessary and/or have been designed adequately, i.e., robustly, for the required power spectrum.

The high-voltage damper is an active high-voltage component comprising a shock absorber of a wheel suspension of the electric vehicle, which dynamically establishes a degree of damping of the shock absorber and tends to generate potentially damaging transients, especially in a limit region of the vertical dynamics.

In the following, the disclosure shall be described for the high-voltage damper. However, the disclosure, with appropriate adaptations, can be applied to other high-voltage components different from the high-voltage damper.

On the one hand, the wheel suspension of a vehicle must be efficient, i.e., it must provide a good damping for a variety of different roadways and travel speeds, in particular, it must have an adequate degree of damping. Accordingly, methods are known for measuring the damping of a shock absorber, i.e., for measuring a mechanical behavior of the shock absorber.

Thus, EP 3 193 152 A1 discloses a method for detecting a degree of damping of a shock absorber associated with a wheel of a vehicle, wherein the wheel is periodically loaded by way of a loading device and caused to vibrate. The degree of damping of the shock absorber is calculated from a phase shift of the vibrating wheel with respect to the periodic loading, as measured at a resonance frequency of the vibrating wheel under the periodic loading.

Also DE 10 2015 007 632 A1 discloses a method for testing a wheel suspension of a vehicle, wherein a wheel of a vehicle held by way of a wheel suspension comprising a shock absorber on a chassis provided with proxy masses is loaded by a first loading device configured as a vehicle test stand corresponding to a real roadway profile and state variables of the wheel suspension dependent on the loading are determined. After this, a modified wheel suspension of the same type —without a chassis—is loaded by a second loading device configured as a wheel suspension test stand, depending on the previously determined state variables.

US 2007/0260372 A1 discloses a further method for the testing of wheel suspensions of a vehicle, wherein wheels of a vehicle held on a chassis provided with proxy masses by way of a wheel suspension comprising a shock absorber are loaded by a loading device configured as a vehicle test stand, sensors associated with each of the wheel suspensions detect state variables of the wheel suspensions, and an arithmetic device determines a test result from the detected state variables.

On the other hand, the high-voltage damper associated with a wheel suspension should not damage other high-voltage components of the high-voltage network during the operation of the electric vehicle. However, the detecting of a transient of the high-voltage damper during the operation of the electric vehicle, i.e., under real conditions, is costly and difficult. Moreover, it is desirable to reliably measure the influence of the high-voltage damper on the high-voltage network already during the development of the electric vehicle, i.e., before final manufacture of the electric vehicle, in order to adequately design the further high-voltage components of the electric vehicle at an early stage.

BRIEF SUMMARY

Embodiments of the disclosure provide a method for detecting a transient of a high-voltage damper of an electric vehicle which can be performed in an easy, economical, time-independent and location-independent manner. Other embodiments of the disclosure provide a method for the design of a high-voltage component of a high-voltage network of an electric vehicle and to provide a device for loading a high-voltage damper of an electric vehicle.

One embodiment of the disclosure is a method for detection of a transient of a high-voltage damper of an electric vehicle, in which an electric vehicle is provided, having a high-voltage network and a high-voltage damper connected to the high-voltage network, and a measurement device connected to the high-voltage network detects a transient produced by the high-voltage damper as a result of a loading. The detected transient determines an influence of the high-voltage component on the high-voltage network of the electric vehicle and a risk of damaging every other high-voltage component of the electric vehicle. A voltage meter or a current meter can be used as the measurement device.

According to the disclosure, a loading device is mounted in the electric vehicle and coupled to a hydraulic unit of the high-voltage damper, the mounted and coupled loading device loads the hydraulic unit, and the measurement device detects a transient produced by the high-voltage damper as a result of the loading. The loading device applies a time-dependent force to the hydraulic unit and simulates a vertical dynamics corresponding to a real operation of the electric vehicle. In particular, a limit operation can be simulated, i.e., an operation of the electric vehicle in a limit region of a vertical dynamics.

The vertical dynamics advantageously encompasses frequencies in a frequency range from 20 Hz to 40 Hz. For a vertical dynamics in this frequency range, the high-voltage damper can produce especially strong transients.

The transient is detected thanks to the loading device without a real travel of the electric vehicle on a real roadway, such as an uneven road. In other words, the disclosure allows an easy and economical detection of the transient independently of the location and/or the time.

Preferably, the loading device loads the hydraulic unit dependent on a particular time-dependent load profile. The time-dependent load profile defines a time-dependent force with which the loading device loads the high-voltage damper. By way of the time-dependent load profile, the vertical dynamics for which the transient is detected is determined. The time-dependent load profile can be stored in an arithmetic unit (e.g., microprocessor) of the loading device or be transmitted to an arithmetic unit of the loading device.

The time-dependent load profile can be determined artificially or corresponding to a real measured loading. The artificially determined or also synthetic time-dependent load profile can model a limit loading of the high-voltage damper which occurs extremely seldom in reality. The time-dependent load profile corresponding to a measured real loading can model a loading of the high-voltage damper typically occurring in reality. Of course, the determining of the time-dependent load profiles can involve a combination of artificial and measured real loadings.

Advantageously, the transient is detected for a selected load level of the high-voltage damper. The load level defines a condition of rest of the high-voltage damper. Different load levels correspond to different weights of the electric vehicle. The weight of the electric vehicle comprises the weights of passengers and/or cargo of the electric vehicle.

The load level can be selected from a plurality of different load levels. Different load levels will occur, depending on the passengers or the cargo, in which the high-voltage damper is operated. The load level can be selected by way of suitable test weights.

The electric vehicle is advantageously provided on a homologation test stand or on a roller test stand. The homologation test stand and the roller test stand are used during the development of an electric vehicle. A separate test stand for the detecting of transients is not necessary.

Yet another embodiment of the disclosure is a method for designing a high-voltage component of a high-voltage network of an electric vehicle, wherein a further component of the high-voltage network other than a high-voltage damper of a high-voltage network of an electric vehicle is designed dependent on a transient produced by the high-voltage damper. The design of the further high-voltage component ensures a protection of the further high-voltage component against the transient applied by the high-voltage damper to the high-voltage network during the operation of the electric vehicle.

The further high-voltage component can comprise an adequately designed capacitor or electronic filter for protection against the transient. Adequate design involves a dimensioning of the capacitor or components of the electronic filter so that the capacitor or the electronic filter efficiently protects the further high-voltage component, i.e., its action is neither too weak nor too strong.

According to the disclosure, the transient is detected in a method according to one embodiment of the disclosure for detection of a transient of a high-voltage damper of an electric vehicle. The method according to the disclosure allows the detecting of the transient in an easy, economical, time-independent and location-independent manner, which facilitates the designing of the further high-voltage component.

A further embodiment of the disclosure is a device (for loading a high-voltage damper of an electric vehicle, in short: a loading device for a high-voltage damper of an electric vehicle. The loading device is attuned to the high-voltage damper and can be installed as a component in the electric vehicle. Each high-voltage damper of the electric vehicle can be associated with a dedicated loading device.

According to the disclosure, the device is adapted to be used in a method according to one embodiment of the disclosure for detection of a transient of a high-voltage damper of an electric vehicle. In this way, the loading device allows a detection of the transient of the high-voltage damper in an easy, economical, time-independent and location-independent manner.

Preferably, the device comprises a pump system, a valve, a coupling device for coupling the device to a hydraulic unit of the high-voltage damper, and an arithmetic unit functionally connected to the pump system and the valve for automatic control of the pump system and the valve. Briefly put, the loading device can be designed hydraulically for an automatic operation. The loading device can be designed for operating points above 17 bar.

Advantageously, the arithmetic unit is adapted to control the pump system and/or the valve automatically, depending on a particular time-dependent load profile. The arithmetic unit can comprise a storage for storing of time-dependent load profiles and be adapted to selecting a stored time-dependent load profile for loading the high-voltage damper. The arithmetic unit can be adapted to receive each time-dependent load profile from an external source, especially in wireless manner, and to store it in the storage.

A major benefit of the method according to the disclosure for detecting a transient of a high-voltage damper of an electric vehicle is that it involves a detecting of the transient in an easy, economical, time-independent and location-independent manner. In this way, a reliable function and long service life of a high-voltage network of an electric vehicle is made possible. A further benefit is that the detecting of the transient is done without a special test stand for the electric vehicle.

BRIEF DESCRIPTION OF THE SEVERAL VIEWS OF THE DRAWING

The disclosure is represented schematically with the aid of one embodiment in the drawings and shall be further described with reference to the drawings.

The FIGURE shows in a top view, an electric vehicle having a loading device according to one embodiment of the disclosure.

DETAILED DESCRIPTION

The FIGURE shows in a top view an electric vehicle 1 having a loading device 2 according to one embodiment of the disclosure. The electric vehicle 1 comprises a high-voltage network, a high-voltage damper 10 connected to the high-voltage network, and a loading device 2, which is mounted in the electric vehicle 1 and coupled to a hydraulic unit of the high-voltage damper 10.

The loading device 2 is adapted to be used in a method according to the disclosure, which is described in the following. The loading device 2 can encompass a pump system, a valve, a coupling device for coupling the device to a hydraulic unit of the high-voltage damper 10, and an arithmetic unit functionally connected to the pump system and the valve for automatic control of the pump system and the valve. The arithmetic unit is adapted to control the pump system and/or the valve depending on a particular time-dependent load profile 20.

Moreover, the electric vehicle 1 can encompass, in familiar manner, a high-voltage battery 11, an electric motor 12 having a power electronics 120, a charger 13, a charging socket 14, a DC voltage converter 15, a heater 16, an intelligent emergency brake system 17, an electrical coolant compressor 18 and/or an electronic torque distributor 19 as further high-voltage components, each of which is hooked up to the high-voltage network.

The following method according to the disclosure is carried out to detect a transient 100 of the high-voltage damper 10 of the electric vehicle 1.

The electric vehicle 1 is provided with the high-voltage network and the high-voltage damper 10 connected to the high-voltage network. The electric vehicle 1 can be provided on a homologation test stand or on a roller test stand.

A measurement device 3 connected to the high-voltage network detects the transient 100 produced by the high-voltage damper 10 as a result of a loading.

The loading device 2 mounted in the electric vehicle 1 and coupled to a hydraulic unit (not shown separately) of the high-voltage damper 10 loads the hydraulic unit.

The loading device 2 loads the hydraulic unit preferably independently of the particular time-dependent load profile 20. The time-dependent load profile 20 can be determined artificially or corresponding to a measured real loading.

Advantageously, the transient 100 is detected for a selected load level of the high-voltage damper 10. The load level can be selected from a plurality of different load levels.

For the design of a further high-voltage component of the high-voltage network of the electric vehicle 1 other than the high-voltage damper 10, the following method is carried out.

The further high-voltage component is designed in dependence on a transient 100 generated by the high-voltage damper 10. The transient 100 is detected in a method according to the disclosure for detecting the transient 100 of the high-voltage damper of the electric vehicle.

German patent application no. 102022120172.4, filed Aug. 10, 2022, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for detecting a transient of a voltage damper of an electric vehicle, the method comprising:
    providing an electric vehicle having a voltage network and a voltage damper connected to the voltage network;
    detecting, by a measurement device connected to the voltage network, a transient produced by the voltage damper as a result of a loading;
    mounting a loading device in the electric vehicle;
    coupling the loading device to a hydraulic unit of the voltage damper; and
    loading, by the loading device, the hydraulic unit.

2. The method according to claim 1, wherein the loading device loads the hydraulic unit based on a particular time-dependent load profile.

3. The method according to claim 2, wherein the time-dependent load profile is determined artificially or corresponds to a real measured loading.

4. The method according to claim 1, wherein the transient is detected for a selected load level of the voltage damper.

5. The method according to claim 4, wherein the selected load level is selected from a plurality of different load levels.

6. The method according to claim 1, wherein the electric vehicle is provided on a homologation test stand or on a roller test stand.

7. A method for designing a voltage component of a voltage network of an electric vehicle, the method comprising:
    providing a further component of a voltage network that is different from a voltage damper of the voltage network of an electric vehicle, wherein the further component is designed based on a transient produced by the voltage damper; and
    detecting the transient using the method according to claim 1.

8. A device for loading a voltage damper of an electric vehicle having a voltage network and a voltage damper connected to the voltage network, wherein the device, in operation, performs a method comprising:
    detecting, by a measurement device connected to the voltage network, a transient produced by the voltage damper as a result of a loading;
    coupling the device to a hydraulic unit of the voltage damper; and
    loading, by the device, the hydraulic unit.

9. The device according to claim 8, wherein the device is coupled to the hydraulic unit of the voltage damper, and wherein the device further comprises:
    a pump system;
    a valve; and
    a microprocessor connected to the pump system and the valve, wherein the microprocessor, in operation, controls the pump system and the valve.

10. The device according to claim 9, wherein the microprocessor, in operation, controls the pump system or the valve based on a particular time-dependent load profile.

* * * * *